Nov. 28, 1933.  T. M. MEARS  1,937,290
MACHINE FOR MAKING SECTOR SHAPED PIES AND MATRIX THEREFOR
Filed Jan. 16, 1932  3 Sheets-Sheet 1
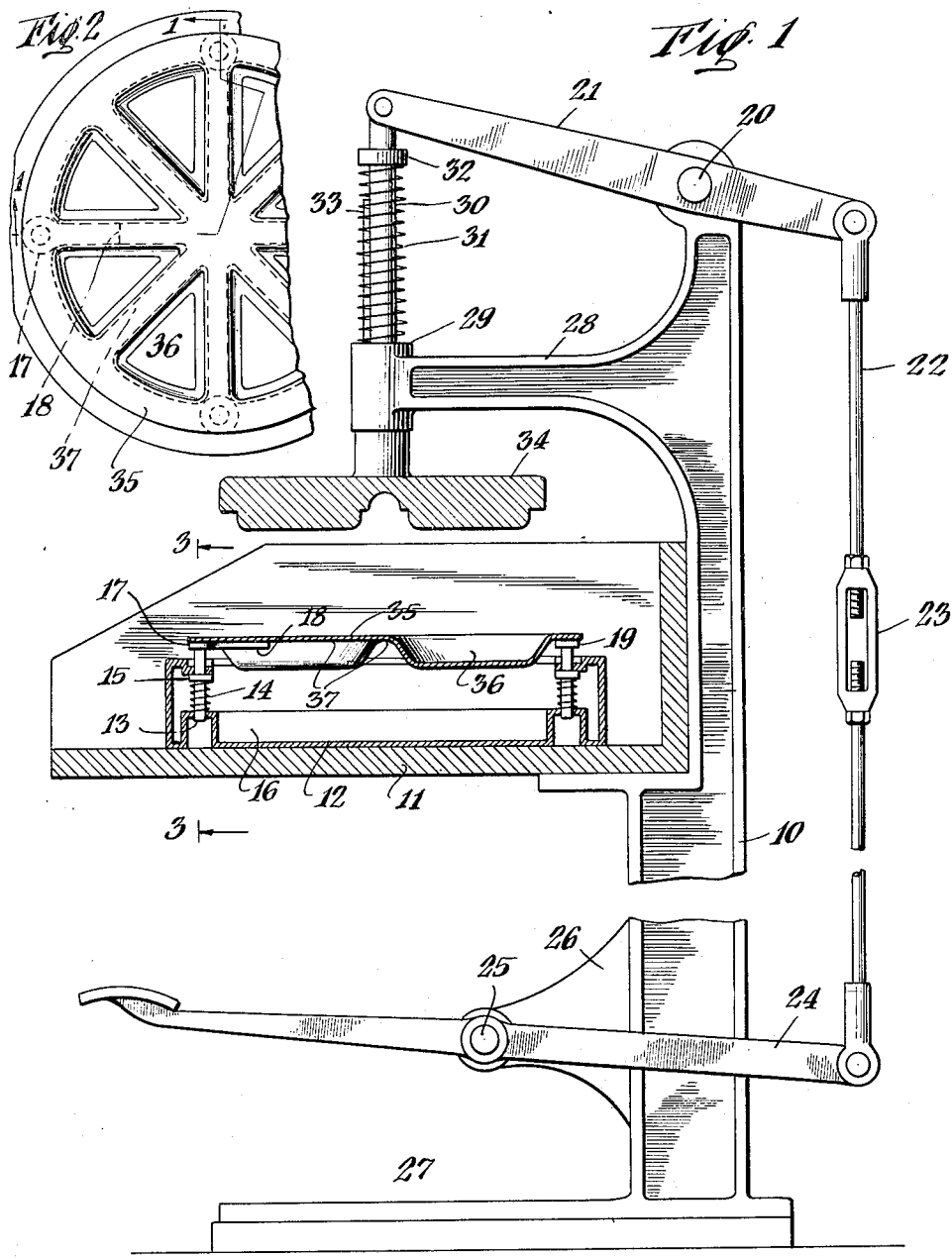
INVENTOR
Theodore M. Mears
BY
Charles A. Morton
ATTORNEY Nov. 28, 1933.  T. M. MEARS  1,937,290
MACHINE FOR MAKING SECTOR SHAPED PIES AND MATRIX THEREFOR
Filed Jan. 16, 1932   3 Sheets-Sheet 2
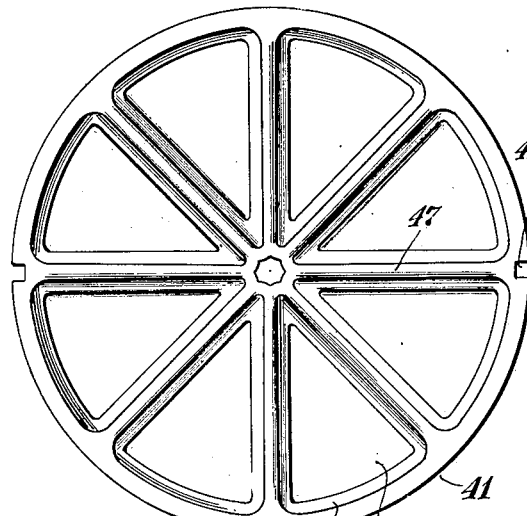
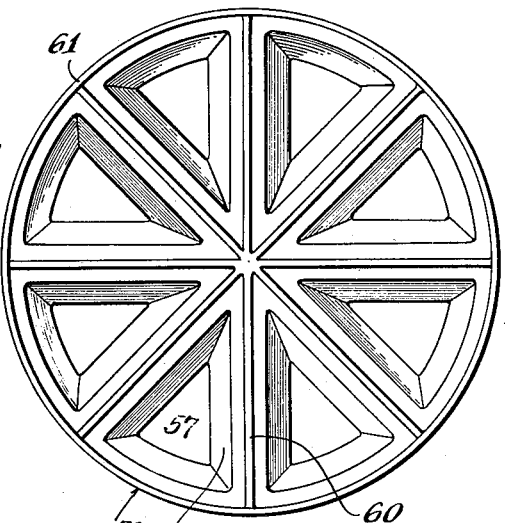
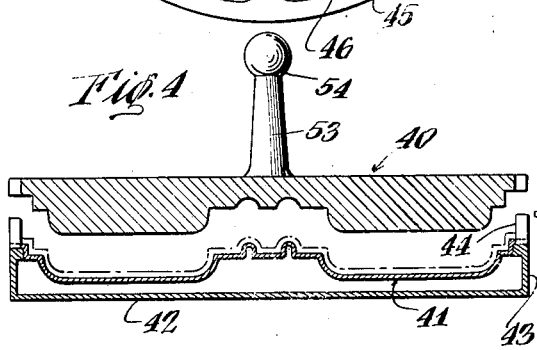
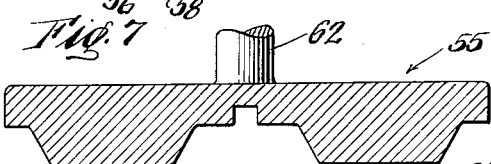
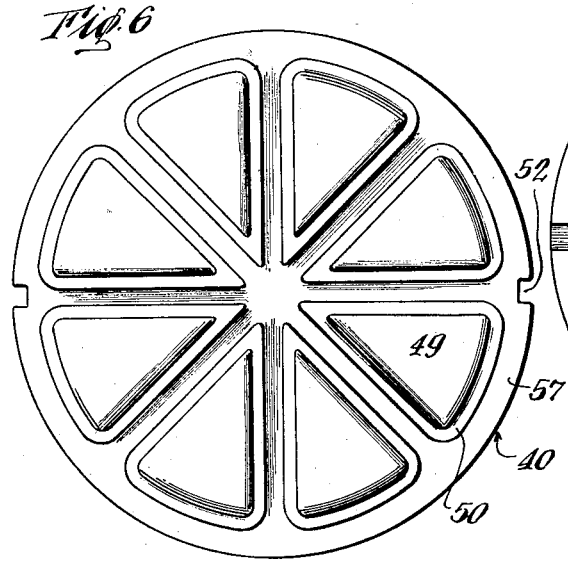
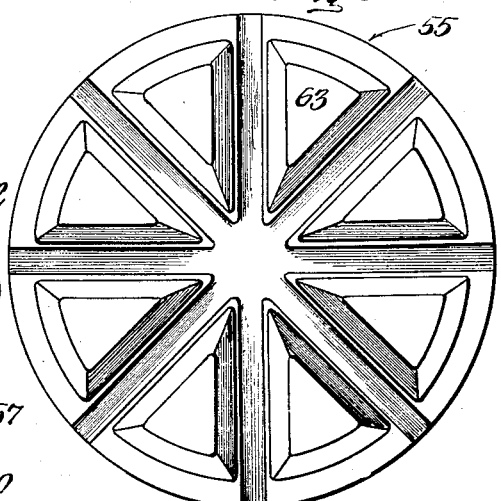
INVENTOR
Theodore M. Mears
BY
Charles A. Morton
ATTORNEY Nov. 28, 1933.                T. M. MEARS                 1,937,290
           MACHINE FOR MAKING SECTOR SHAPED PIES AND MATRIX THEREFOR
                         Filed Jan. 16, 1932         3 Sheets-Sheet 3
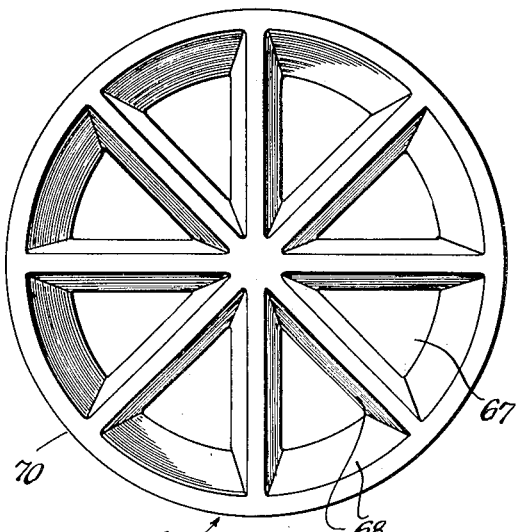
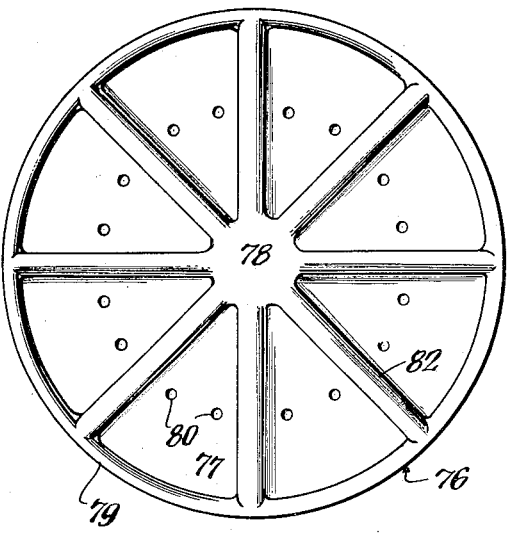
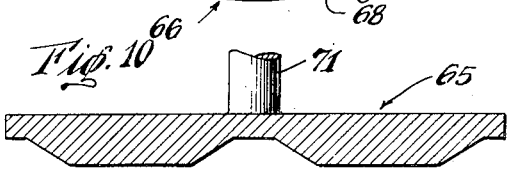
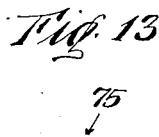
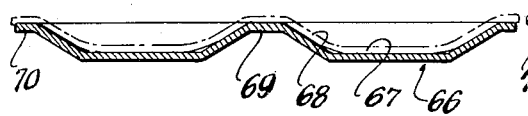
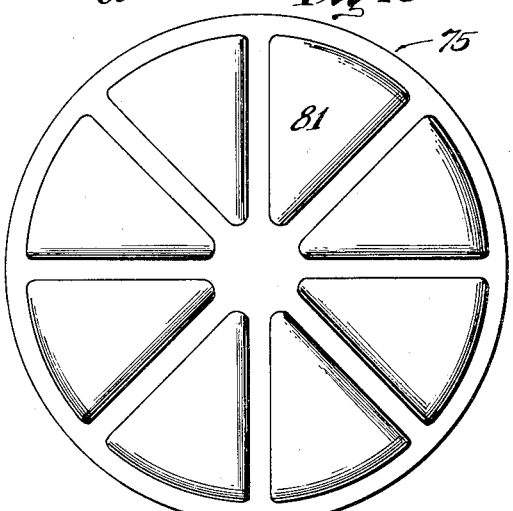
INVENTOR
Theodore M. Mears
BY
Charles A. Morton
ATTORNEY Patented Nov. 28, 1933

1,937,290

UNITED STATES PATENT OFFICE 1,937,290

MACHINE FOR MAKING SECTOR SHAPED PIES AND MATRIX THEREFOR

Theodore M. Mears, Brooklyn, N. Y., assignor to The Tri-Pie Corporation, Brooklyn, N. Y., a corporation of Delaware Application January 16, 1932. Serial No. 587,140

1 Claim. (Cl. 107—15)

This invention relates to machines for making sector shaped pies and a matrix therefor. This application is a continuation in part of my former application Serial No. 523,254 filed March 17, 1931 now U. S. Patent No. 1,841,494 granted January 19, 1932.

One object of this invention is the quick lining of a pie mold.

Another object is to reduce the cost of manufacturing stamped or molded sector shaped individual pies.

Another object is the production of a better sector shaped individual pie.

Another object is an improved form of multiple-unit pie plate.

Other objects will appear from the detailed description which follows.

In the drawings comprising three sheets of fifteen figures numbered Figures 1 to 15 inclusive, several embodiments of the invention are set forth.

Fig. 1 is a side elevation, partly in section, and with some of the parts partially broken away, of one form of die press, the holder and pie plate being in vertical section along line 1—1 of Fig. 2 looking in the direction of the arrows.

Fig. 2 is a plan view of a fragment of the holder and pie plate of Fig. 1, looking downward from above the holder and pie plate of that figure.

Fig. 3 is a vertical section of a fragment of the plate and holder, taken along line 3—3 of Fig. 1, looking in the direction of arrows.

Fig. 4 is central section of one form of pie plate and associated matrix, and Figs. 5 and 6 are respectively a plan and inverted plan view of said plate and matrix.

Fig. 7 is a central section of another form of pie plate and matrix, and Figs. 8 and 9 are respectively a plan and inverted plan view of the said plate and matrix.

Fig. 10 is a central section of a beadless pie plate and matrix therefor, and Figs. 11 and 12 are respectively a plan and inverted plan view of the said plate and matrix.

Fig. 13 is a central section of another form of a cornerless pie plate and associated matrix in the dough lining position, and Figs. 14 and 15 are respectively a plan and inverted plan view of the said plate and matrix.

Like reference characters designate corresponding parts throughout the several figures.

The apparatus consists essentially of a pie plate (Figs. 5, 8, 11 or 14) sub-divided into a plurality of sector shaped receptacles, each receptacle being substantially equal in area to the area of the conventional individual sector shaped pie portion for making sector (or triangular) pies having the cubical contents of the conventional individual sector shaped pie portion, and a matrix having a plurality of sector shaped projections for engaging in the receptacles in the plate. The matrix projections conform in number and arrangement to the plate receptacles, but the former are smaller in dimensions than the latter by the ultimate thickness of a layer of dough. Means is likewise employed to assure correct registry of the pie plate and the matrix.

The matrix may be mounted in a press one form of press being illustrated in Fig. 1. A base or pedestal 27, supports a framework 10, to which a suitable bench top 11 is suitably secured. Foot operated lever 24, is pivotally connected at 25 to an extension 26 of frame 10. A second lever 21 for controlling the movement of plunger 30, may be pivotally connected to frame 10 as at 20, and levers 21 and 24 may be interconnected by pivoted rods 22—22, which are adjustably united by turnbuckle 23. Plunger 30 is slidably operable in holder 29 of bracket 28, the plunger being keyed in a keyway in the holder 29 by means of key 33. A spring 31 is mounted on plunger 30, between holder 29 and the collar 32, to cause the plunger to which matrix 34 is secured to normally remain in the position shown in Fig. 1, the downward movement of plunger 30 carrying collar 32 being effected against the ever increasing tension of coiled spring 31. Suitable means for centering the pie plate relative to matrix 34 to assure correct registry of plate and matrix is provided. This means may consist simply of an X shaped member conforming in cross section to the channel in the underside of the plate 35. In Fig. 1 however a holder 12 for plate 35 is shown having a plurality of extension members 18, adapted to engage in the channels in the underside of the plate. Each extension member 18 is also provided with spring operated studs 17 (see Fig. 3) for raising the pie plate 35 above the flange of holder 12 to facilitate the removal of the pie plate from the holder. Spring 14, tensioned by the downward movement of stud 17 (or 19) under control of the flange 37, of pie plate 35 which is in turn forced downward by the matrix 34 under control of foot operated lever 24, presses against collar 15 so that when the plunger 30 returns to normal due to the removal of the foot from lever 24, spring 14 forces stud 17 or 19 (as the case may be) supporting pie plate 35 upwards, until the fingers can be freely inserted beneath pie plate 35. The chamber 16 formed in holder 12 preferably conforms in configuration to that of the underside of the pie plate 35.

In operation, a pie plate 35 having a layer of dough overlying it, is placed in holder 12, so that extension members 18 engage in the channels in the underside of the plate, thereby centering the pie plate in the holder in proper position to register with matrix 34. Matrix 34 carried by plunger 31, is now forced downwards, as by foot operated lever 24, until the matrix has effected the dough lining operation (see Fig. 13), whereupon the pressure is removed, matrix 34 returns to normal, and plate 35 may now be removed and replaced by the next dough covered plate and the operation is repeated.

The bench 11 is designed to accommodate the particular form of pie plate which it is desired to use. Bench 11 or holder 12 may be designed to be universal so that it will accommodate any of the various forms of pie plate shown in Figs. 2, 5, 8, 11, or 14 interchangeably.

Figs. 4, 5 and 6 show one form of plate 41 and matrix 40. In this embodiment the plate, Fig. 5, which may be circular in form, is provided with a plurality of sector shaped receptacles 45, each receptacle having curved side walls and a curved back wall, which are best shown in the sectional view (Fig. 4). Each receptacle is surrounded by a laterally and outwardly extending flange 46, the flanges of adjacent receptacles merging together as by a series of reinforcing beads 47. The matrix 40 (Fig. 6) consists of a plurality of sector shaped projections 49 conforming in number, shape and arrangement to the number, shape and arrangement of the receptacles 45 of pie plate 41 (Fig. 5). The projections 49 are slightly smaller than receptacles 45 by an amount equal to the ultimate thickness of a layer of dough, so that when said projections are brought into registry with the dough-lined receptacles, the dough is snugly and evenly lined against the wall of the pie plate as is best indicated in dotted lines in Fig. 4. The flanges 50 encircling projections 49, will register with the flanges 46 encircling the receptacle 45. The dough lining operation may be performed manually or mechanically. If performed mechanically, matrix 40 will be assembled in a press such for example as that shown in Fig. 1 and operated in the manner previously described. If operated manually, matrix 40 may be provided with a suitable handle 54 connected to the matrix by a shaft 53, and a frame 42 operable to effect co-operative registry of plate 41 and matrix 40 may be provided. This frame 42 is provided with suitable registry devices as for example the guide members 44 formed in the side walls 43 (Fig. 4). These guide members 44 are adapted to receive the notched openings 48 and 52 of the pie plate and matrix respectively. In operation the dough covered plate is placed in the frame 42 so that the notched openings 48 register with the guides 44. Matrix 40 is then so placed that the notched openings 52 likewise engage in the guides 44, and matrix 40 is now brought into co-operative registry with plate 41, to cause the lower layer of dough overlying the plate 41, to be snugly lined against the walls of the plate to assume the configuration of said plate as is indicated in Fig. 4 which shows the relative position of the plate 41 and the matrix 40 immediately after the dough lining operation has been completed.

Matrix 40 is now withdrawn from plate 41, and the latter is now taken from the frame 42. As each plate 41 of the series is bodily interchangeable, relative to frame 42, the dough covered plates of the series may be inserted in frame 42 in succession in the manner previously described, and the matrix 40 brought into cooperative registry with each of said dough covered plates in succession to perform the dough lining operation.

Figs. 7, 8 and 9 illustrate another embodiment of the pie plate 56 and associated matrix 55, wherein the walls of the receptacles 57 are bevelled as indicated at 58 (Figs. 8 and 9), and the rounded beads 47 (Fig. 5) are replaced by the squared beads 60 and 61. The projections 63 of matrix 55 conform in shape, number and arrangement to the shape, number and arrangement of the receptacles 57 of plate 56, the projections being smaller by the ultimate thickness of a layer of dough than the receptacles 57. Matrix 55 is provided with a shaft 62 and is designed to be bodily interchangeable with matrix 34 of Fig. 1.

Figs. 10, 11 and 12 show another form of matrix and plate differing from the form shown in Figs. 7, 8 and 9 by the omission from the plate 66 of the beads 60 and 61 and the modification of the matrix to correspond. As shown in the drawings the plate 66 is likewise shallower than the plate 56 of Fig. 8. Plate 66 is provided with a plurality of sector shaped receptacles 67 having bevelled side and back walls 68, the receptacles being surrounded by a plurality of laterally and outwardly projecting smooth flanges merging together to define a smoth topped multiple-unit pie plate surrounded by a peripheral flange occupying the same plane as the partitioning flanges between receptacles. A plate of this type like the plate 76 of Fig. 14 has the advantage over plates provided with outwardly projecting beads (such as are shown in Figs. 5 and 8) because smooth topped pie plates are more readily cleaned and offer less resistance to the removal of the baked pies with the result that the risk of damaging the pie crust during the removal operation is greatly reduced when pans of the character shown in Figs. 11 and 14 are employed. It will likewise be observed that pans 66 and 76 are shallower than pans 41 and 56. The pies made in the various plates (Figs. 5, 8, 11 and 14) are all intended to have the cubical contents of the conventional individual sector shaped pie portion, but where the pie is heaped above the flanges of the pie plate in the process of making the same, the wall area of the pie plate can be correspondingly reduced. Obviously as the wall area in contact with the dough is reduced, the removal of the baked pie from the pie plate without damage to the dough is facilitated. Matrix 65 is likewise provided with the shaft 71 so as to render said matrix interchangeable with the matrix 34 of the machine of Fig. 1.

Figs. 13, 14 and 15 illustrate still another embodiment of pie plate 76 and its associated matrix 75. As appears from a comparison of Figs. 11 and 14 all sharp corners and angles have been removed from the pie plate 76. This is accomplished by rounding off the corners formed by the merger of the side walls with the flanges and rounding off the angles formed between adjacent side walls and the side walls and back walls. Each receptacle 77 is provided with a plurality of vents 80 to permit the air underlying the lower layer of dough to be forced out of the pie plate when the matrix 75 is brought into co-operative registry with the pie plate 76 as indicated in the sectional view (Fig. 13). By forcing the air out of the plate the formation of air pockets in the lower layer of dough is eliminated. It should, of course, be understood that the projections 81 of the matrix conform in shape, number and arrangement to the receptacles 77 of the plate, the projections being smaller than the receptacles by the ultimate thickness of the lower layer of dough. Matrix 75 is of course, intended to be interchangeable with matrix 34 of the machine of Fig. 1.

It should, of course, be understood that while for purposes of illustration the plates illustrated in Figs. 5, 8, 11 and 14 define a circular figure, the invention is not intended to be so limited as the plates may be made in any preferred shape and for any desired number of sector shaped or triangular shaped receptacles without departing from the spirit of the invention.

What is claimed is:

In a pie making machine and in combination, a frame-work having a holder therein, a plunger, a matrix carried by said plunger, a spring, said plunger being slidably keyed to said holder to move said matrix vertically downwards against the tension of said spring, a pie plate holder, means for yieldably centering a pie plate in said plate holder and relative to the said matrix, an upper and a lower lever, each of said levers being pivotally mounted on said frame work, a pair of rods, one of said rods being pivotally connected to the upper lever and the other pivotally connected to the lower lever, a turn buckle adjustably uniting adjacent ends of said rods together, and a pivotal connection between the plunger and the upper lever, said lower lever being operable under the application of foot pressure to force said matrix vertically downwards into registry with a plate centered in said plate holder.

THEODORE M. MEARS.